United States Patent
Kobayashi et al.

(10) Patent No.: US 7,082,720 B2
(45) Date of Patent: Aug. 1, 2006

(54) CABLE GUIDE AND POWER SUPPLY APPARATUS FOR A VEHICLE SLIDE DOOR

(75) Inventors: Yoshinao Kobayashi, Yokkaichi (JP); Shigeru Suzuki, Yokkaichi (JP)

(73) Assignees: Sumitomo Wiring Systems, Ltd. (JP); Honda Giken Kogyo Kabushiki Kaisha (JP)

( * ) Notice: Subject to any disclaimer, the term of this patent is extended or adjusted under 35 U.S.C. 154(b) by 15 days.

(21) Appl. No.: 10/602,313

(22) Filed: Jun. 24, 2003

(65) Prior Publication Data

US 2004/0003543 A1    Jan. 8, 2004

(30) Foreign Application Priority Data

| Jun. 25, 2002 | (JP) | 2002-184501 |
| Jul. 1, 2002 | (JP) | 2002-191683 |
| Jul. 1, 2002 | (JP) | 2002-191684 |

(51) Int. Cl.
*E05F 11/00* (2006.01)
(52) U.S. Cl. ............................................. 49/360
(58) Field of Classification Search ................ 49/325, 49/360; 296/155
See application file for complete search history.

(56) References Cited

U.S. PATENT DOCUMENTS

| 3,020,362 A | 2/1962 | Waninger |
| 3,053,358 A | 9/1962 | Gross |
| 3,284,036 A | 11/1966 | Nansel |
| 3,330,105 A | 7/1967 | Weber |
| 3,347,038 A | 10/1967 | Teppert |
| 3,716,986 A | 2/1973 | Cork et al. |
| 3,779,003 A | 12/1973 | Boissevain et al. |
| 3,868,011 A | 2/1975 | Janzen et al. |
| 3,921,388 A | 11/1975 | Loos et al. |
| 3,994,373 A | 11/1976 | Loos et al. |
| 4,253,027 A | 2/1981 | Taylor et al. |
| 4,392,344 A | 7/1983 | Gordon et al. |
| 4,420,017 A | 12/1983 | Moritz |
| 4,462,565 A | 7/1984 | Johnson |
| 4,582,281 A | 4/1986 | Van Camp |
| 4,600,817 A | 7/1986 | Hackenberg |
| 4,625,507 A | 12/1986 | Moritz et al. |
| 4,626,233 A | 12/1986 | Moritz |
| 4,658,577 A | 4/1987 | Klein |
| 4,672,805 A | 6/1987 | Moritz |
| 4,726,247 A * | 2/1988 | Hormann .................. 74/424.6 |
| 4,807,432 A | 2/1989 | Mauri |
| 4,819,495 A * | 4/1989 | Hormann .................. 74/424.6 |
| 4,840,023 A | 6/1989 | Borsani |
| 4,988,838 A | 1/1991 | Kirtland |

(Continued)

FOREIGN PATENT DOCUMENTS

DE    199 05 022    8/2000

(Continued)

*Primary Examiner*—Jerry Redman
(74) *Attorney, Agent, or Firm*—Gerald E. Hespos; Anthony J. Casella (57) ABSTRACT

A power supply apparatus for a vehicle slide door, including a cable installed between a vehicle body and a slide door and a cable guide for guiding the cable. The cable guide includes a plurality of link members interconnected into a linear configuration. The cable guide includes a first section and a second section. The first section is capable of being bent in a predetermined direction from a generally linear condition. The second section is capable of being bent in an opposite direction opposite to the predetermined direction from a generally linear condition.

9 Claims, 10 Drawing Sheets

U.S. PATENT DOCUMENTS

| | | | |
|---|---|---|---|
| 5,083,472 A | | 1/1992 | Kang |
| 5,178,247 A | | 1/1993 | Vagaggini |
| 5,271,182 A | * | 12/1993 | Greisner et al. ............... 49/325 |
| 5,581,944 A | * | 12/1996 | Kornbrekke et al. ........... 49/28 |
| 5,860,274 A | | 1/1999 | Saleh et al. |
| 5,890,357 A | | 4/1999 | Blase |
| 5,900,586 A | | 5/1999 | Carr |
| 6,156,974 A | | 12/2000 | Blase |
| 6,174,020 B1 | * | 1/2001 | Knettle et al. ............... 296/155 |
| 6,374,589 B1 | * | 4/2002 | Kunert et al. ................. 59/78.1 |
| 6,494,523 B1 | * | 12/2002 | Kobayashi .................. 296/155 |
| 6,510,682 B1 | * | 1/2003 | Komiya et al. .............. 59/78.1 |
| 6,787,702 B1 | * | 9/2004 | Suzuki ..................... 174/72 A |
| 2001/0004022 A1 | | 6/2001 | Kobayashi |

FOREIGN PATENT DOCUMENTS

| | | | |
|---|---|---|---|
| DE | 199 48 852 | | 8/2001 |
| EP | 0 173 829 | | 10/1986 |
| JP | 06-58033 | * | 3/1994 |
| JP | 10-000936 | | 1/1998 |
| JP | 2001-171443 | * | 6/2001 |
| JP | 2002-127847 | | 5/2002 |

* cited by examiner

CABLE GUIDE AND POWER SUPPLY APPARATUS FOR A VEHICLE SLIDE DOOR

BACKGROUND OF THE INVENTION

1. Field of the Invention

This invention relates to a cable guide for guiding a cable installed between a fixing structure and a moving structure. This invention relates to a power supply apparatus for a vehicle slide door using the cable guide.

2. Background Art

Conventionally, a power supply apparatus for a vehicle slide door is formed as follows: Terminal portions of the abutting type are provided at a slide door and a vehicle body, respectively. When the slide door is closed, the terminal portion on the door and the terminal portion on the vehicle body abut against each other to be electrically connected together, thereby supplying electric power from the vehicle body to the door via the two terminal portions.

In the above conventional configuration, however, there occurs a problem that although electric power can be supplied to the slide door when the slide door is closed, electric power can be not supplied to the slide door when the slide door is open.

SUMMARY OF THE INVENTION

It is an object of this invention to provide a power supply apparatus for a vehicle slide door which can always supply electric power to the slide door regardless of whether the slide door is open or closed.

It is another object of the invention to provide a cable guide which can favorably guide a cable installed between a fixing structure and a moving structure, such as a vehicle body and a slide door.

To attain the above objects, the invention provides a power supply apparatus for a vehicle slide door, including: a cable installed between a vehicle body and a slide door; and a cable guide for guiding the cable, the cable guide comprising a plurality of link members interconnected into a linear configuration. The cable guide includes a first section and a second section. The first section is capable of being bent in a predetermined direction from a generally linear condition. The second section is capable of being bent in an opposite direction opposite to the predetermined direction from a generally linear condition.

Preferably, the power supply apparatus further includes: a first support member which is provided at the vehicle body and which supports one end portion of the cable guide in such a manner that the one end portion is directed toward the slide door in non-parallel relation to a direction of sliding movement of the slide door, and a second support member which is provided at the slide door and supports the other end portion of the cable guide, and can move to pass by the first support member in accordance with the sliding movement of the slide door. The first section is disposed at the vehicle body, and a second section disposed at the slide door. The first section can be bent in both of the predetermined direction and the opposite direction from the generally linear condition. In accordance with the sliding movement of the slide door, the cable guide extends away from the vehicle body, and is bent at the first section to extend toward the second support member.

Preferably, bending directions of interconnecting portions in each of the first and second sections are set to the same direction. The bending direction of each interconnecting portion in the first section is opposite to the bending direction of each interconnecting portion in the second section. During the sliding movement of the slide door, an intermediate portion of the cable guide in the longitudinal direction can be bent into a generally S-shape when viewed from the top.

The invention also provides a cable guide for guiding a cable installed between a fixing structure and a moving structure, including: a plurality of link members interconnected into a linear configuration. The cable guide includes a first section and a second section. The first section is capable of being bent in a predetermined direction from a generally linear condition. The second section is capable of being bent in an opposite direction opposite to the predetermined direction from a generally linear condition.

The invention also provides an automobile including: a vehicle body; a moving structure slidably mounted on the vehicle body; a cable installed between the vehicle body and the moving structure; and a cable guide for guiding the cable. The cable guide includes a plurality of link members interconnected into a linear configuration. The cable guide includes a first section and a second section. The first section is capable of being bent in a predetermined direction from a generally linear condition. The second section is capable of being bent in an opposite direction opposite to the predetermined direction from a generally linear condition.

BRIEF DESCRIPTION OF THE DRAWINGS

The present invention may be more readily described with reference to the accompanying drawings.

DETAILED DESCRIPTION OF THE PREFERRED EMBODIMENTS

The First Preferred Embodiment

A first preferred embodiment of a slide door cable-installing and supporting portion structure (a power supply apparatus for a vehicle slide door) of the present invention will now be described.

Figure 1:
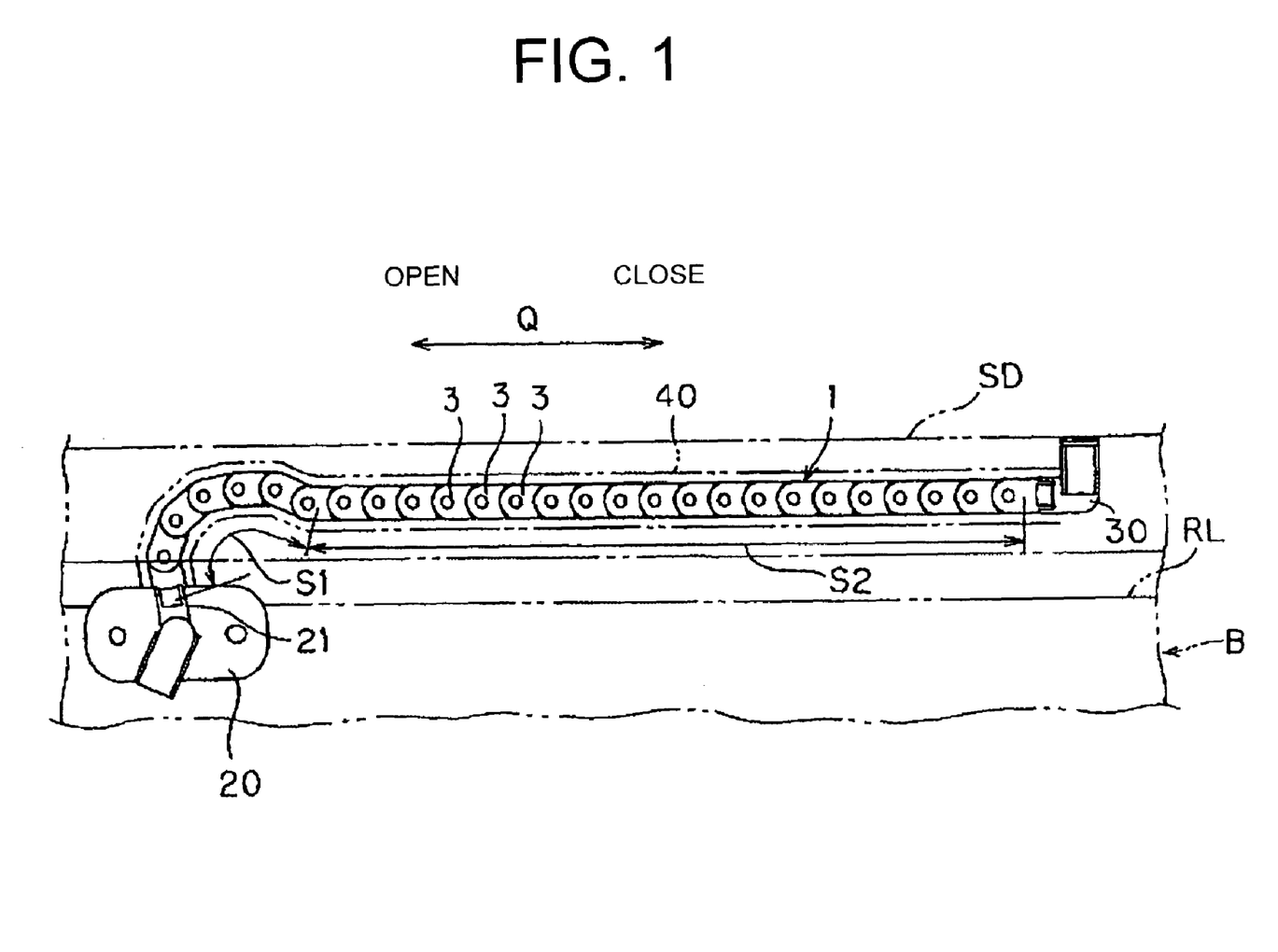
FIG. 1 is a schematic plan view of a first preferred embodiment of a cable-installing and supporting portion structure of the invention (in a fully closed condition).
Figure 2:
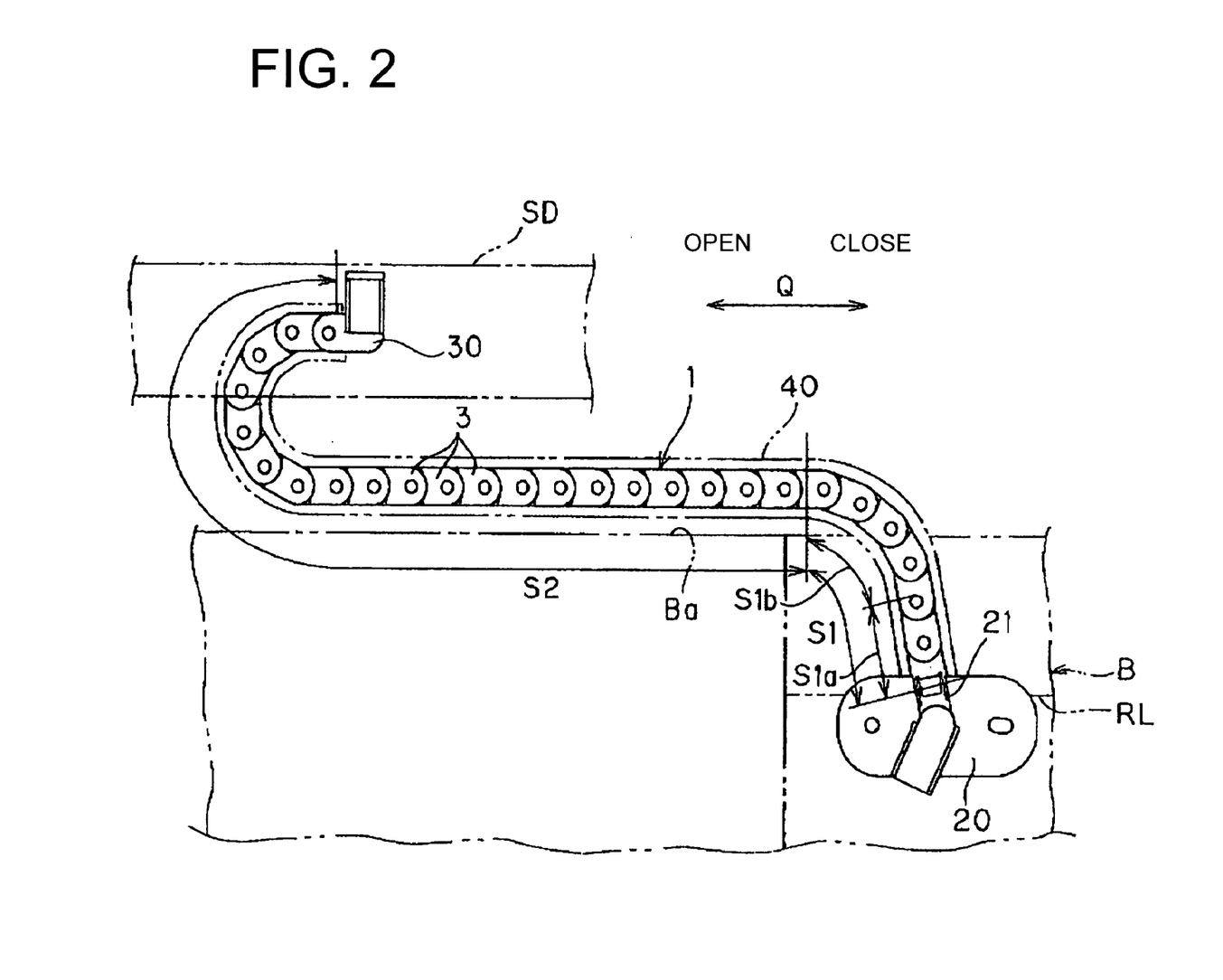
FIG. 2 is a schematic plan view of the cable-installing and supporting portion structure (in an open condition).
Figure 3:
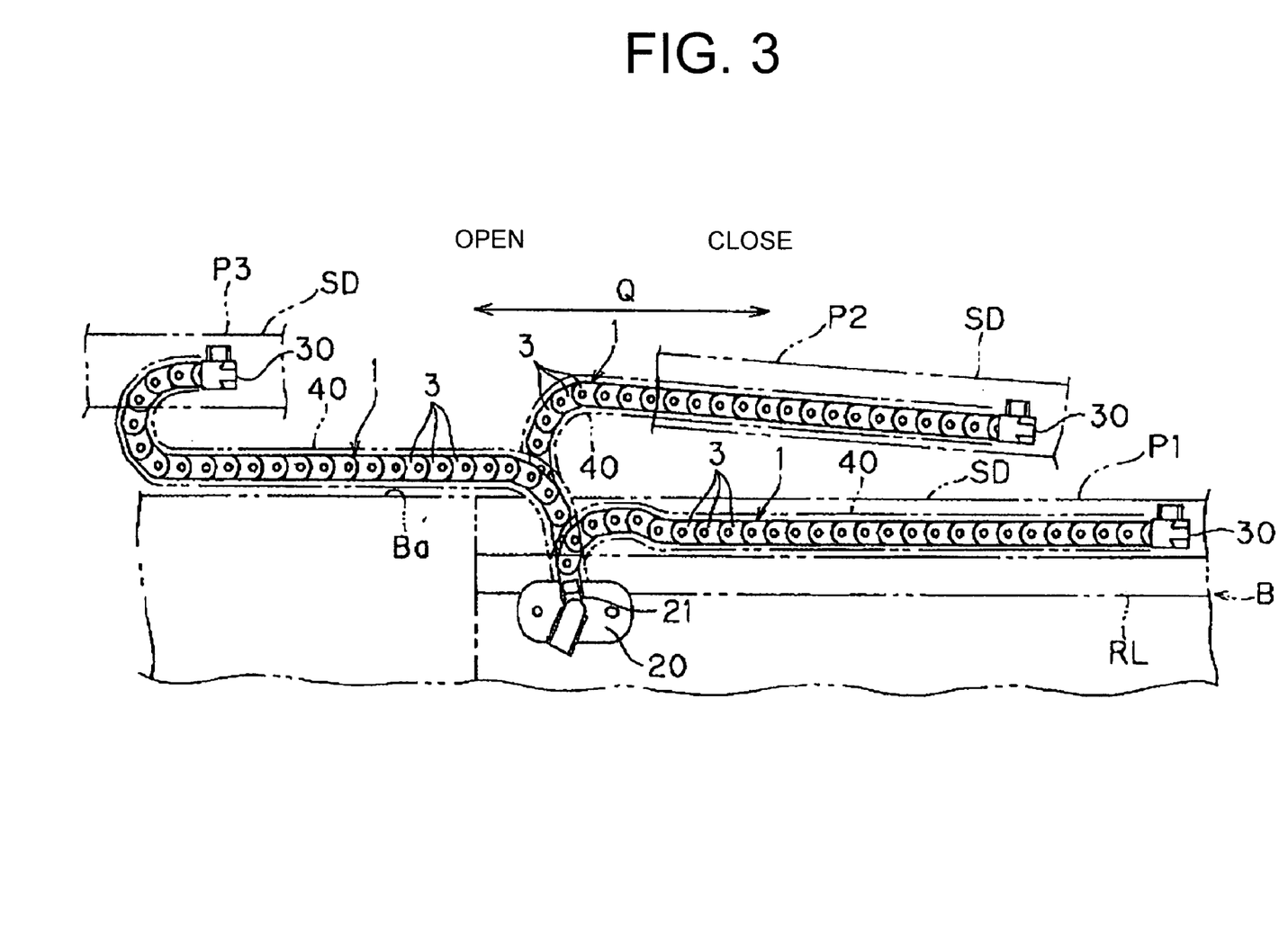
FIG. 3 is a view showing the process of opening and closing a slide door in the cable-installing and supporting portion structure.
Figure 4:
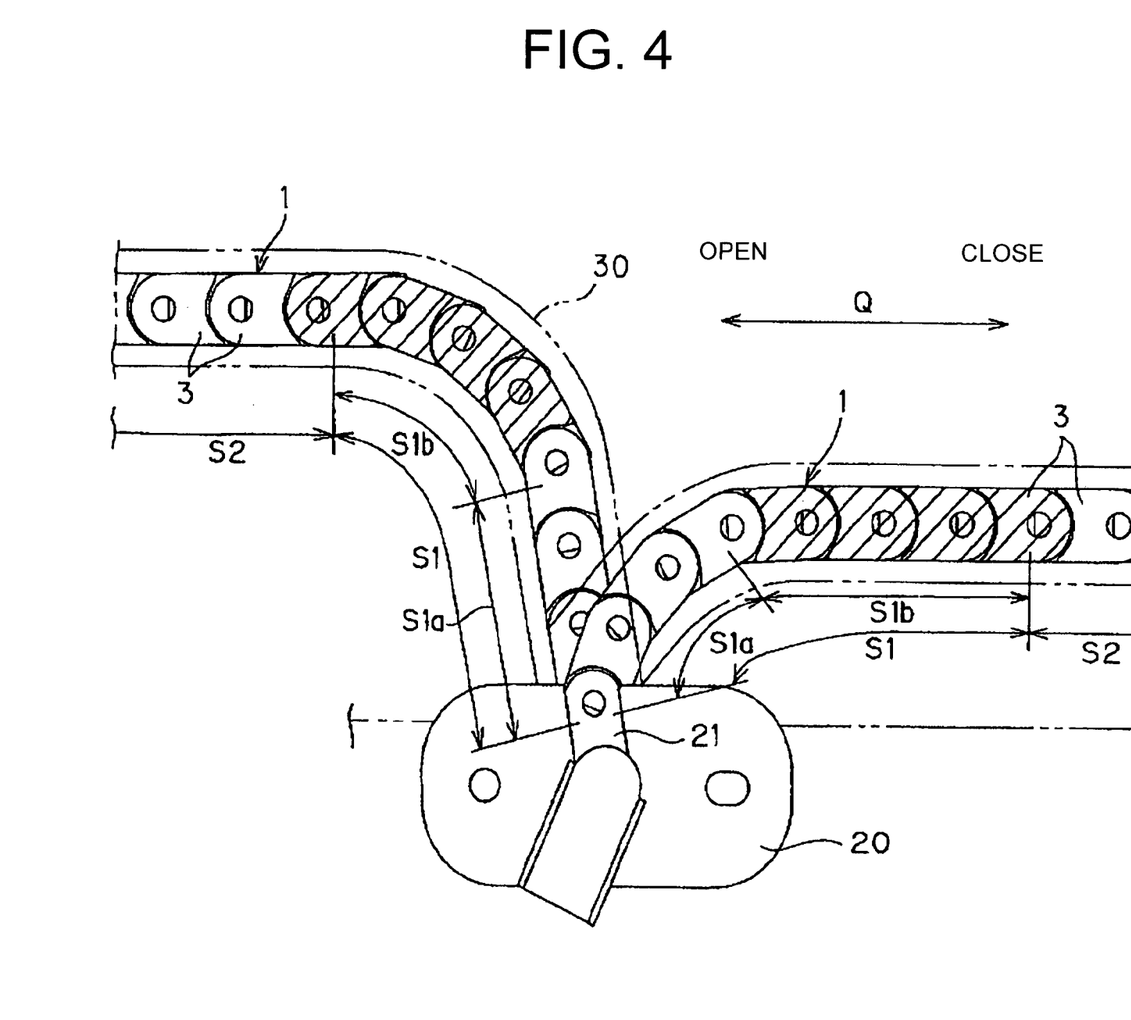
FIG. 4 is an enlarged view of an important portion of the cable-installing and supporting portion structure disposed at a vehicle body.
Figure 5:
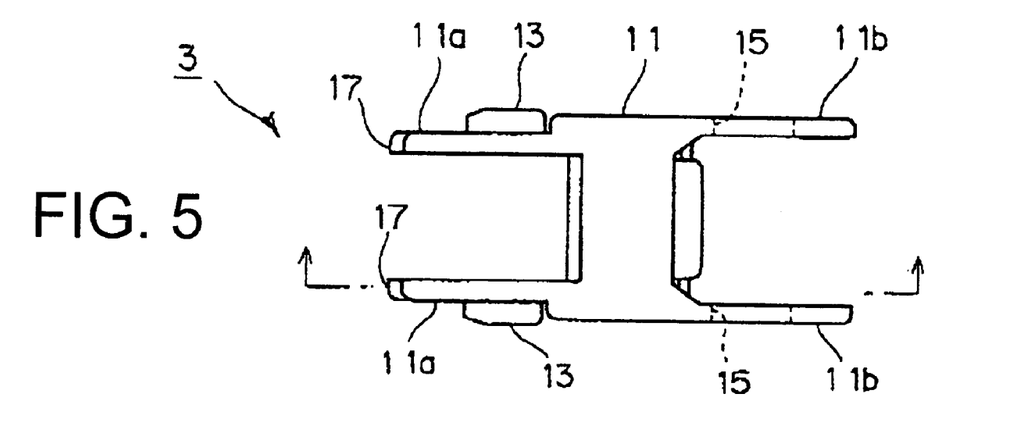
FIG. 5 is a side-elevational view of a link member of a cable guide.

FIG. 1 is a schematic plan view of the cable-installing and supporting portion structure provided in a vehicle (automobile) V in a closed condition of a slide door SD. FIG. 2 is as schematic plan view of the cable-installing and supporting portion structure in an open condition of the slide door SD. FIG. 3 is a view showing the process of opening and closing the slide door SD. FIG. 4 is an enlarged view of an important portion of the cable-installing and supporting portion structure disposed at a vehicle body.

Figure 6:
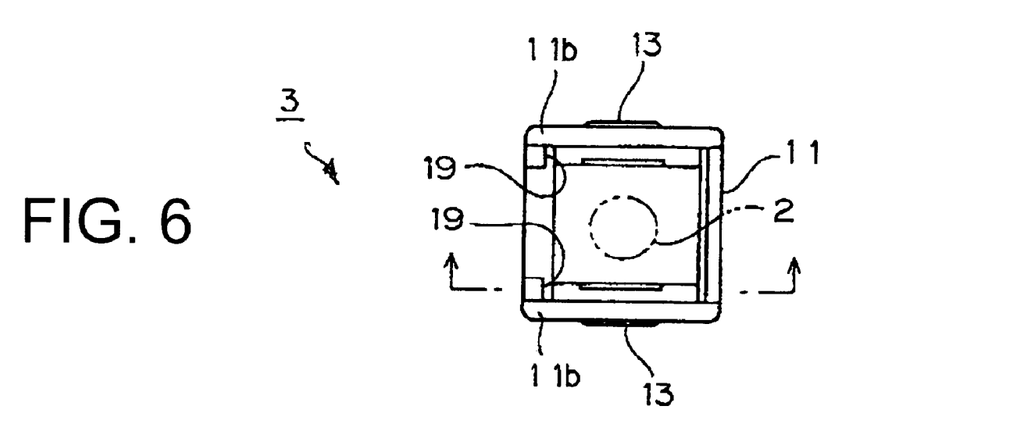
FIG. 6 is a front-elevational view of the link member.
Figure 7:
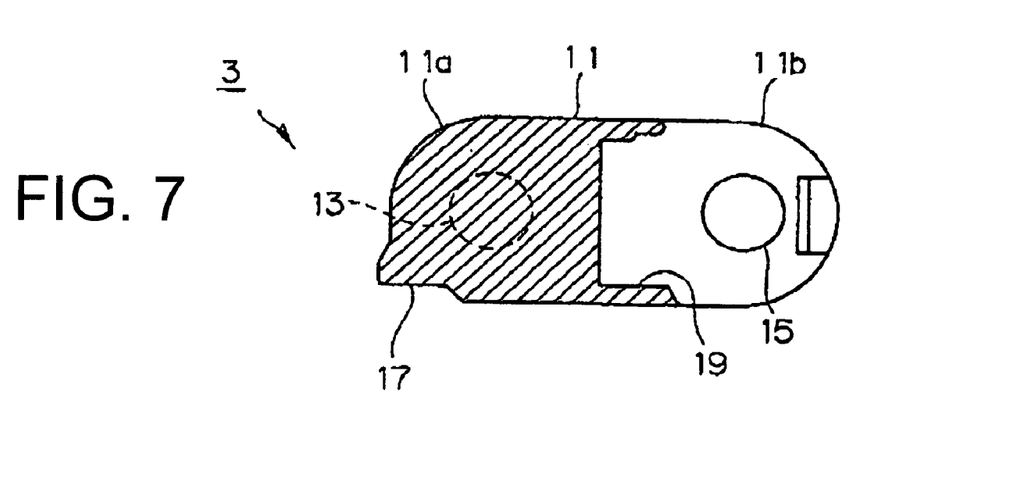
FIG. 7 is a cross-sectional view taken along the line VII—VII of FIGS. 3 and 4.

This cable-installing and supporting portion structure serves to guide and bend a cable 2 (shown only in FIG. 6) installed between the vehicle body B and the slide door SD, and this structure comprises a cable guide 1, the cable 2, a first support member 20 supporting one end portion of the cable guide 1, and a second support member 30 supporting the other end portion of the cable guide 1.

The cable 2 includes a wire for supplying electric power to the slide door SD, and at least one wire for feeding a signal between the slide door SD and the vehicle body B, and this cable 2 is installed between the vehicle body B and the slide door SD.

The cable guide 1 comprises a plurality of link members (links) 3 interconnected into a linear configuration, and the one end portion of this cable guide is supported on the vehicle body B by the first support member 20, while the other end portion thereof is supported on the slide door SD by the second support member 30 (described later). The cable 2 is passed through each of the link members 3, and this cable guide 1 guides and bends the cable 2. In FIG. 3, a position P1 indicates a completely-closed (fully closed) condition of the slide door SD, and a position P2 indicates a partially-open (half open) condition of the slide door SD, and a position P3 indicates a completely-open (fully open) condition of the slide door SD.

The first support member 20 is molded of a resin or the like, and is fixedly secured to the vehicle body by screws (not shown) or the like. More specifically, the first support member is fixedly secured to a lower portion of a door frame of the vehicle body.

The first support member 20 includes a guide tube 21 for guiding the cable 2 extending from the vehicle body B, and the one end portion of the cable guide 1 is supported by the guide tube 21. The cable 2 extends from the vehicle body B, and passes through the guide tube 21 to extend outwardly from the vehicle body B, and is passed through the cable guide 1 in a guided manner. The guide tube 21 and the link member 3, disposed at the one end portion of the cable guide 1, are interconnected by a similar structure (described later in detail) to a structure for interconnecting the adjacent link members 3.

The guide tube 21 is directed toward the slide door SD, and supports the one end portion of the cable guide 1 and one end portion of the cable 2 in such a manner that these one end portions are directed toward the slide door SD in non-parallel relation to a direction Q of sliding movement of the slide door SD. Namely, the guide tube 21 is slightly inclined toward a rear side of the vehicle body B (that is, in a direction away from the second support member 30 in the fully closed condition), and therefore the one end portion of the cable guide 1 and the one end portion of the cable 2 are supported in a manner to be directed slightly obliquely rearwardly relative to the vehicle body B.

The second support member 30 is molded of a resin or the like, and is fixedly secured to the slide door SD by screws (not shown) or the like. More specifically, the second support member is fixedly secured to a lower portion of the slide door SD. The second support member 30 and the other end portion of the cable guide 1 are interconnected by a similar structure (described later in detail) to the structure for interconnecting the adjacent link members 3.

In the fully closed condition of the slide door SD, the second support member 30 is located forwardly of the first support member 20, that is, disposed closer to the front side of the vehicle than the first support member 20 is. In this condition, the second support member 30 supports the other end portion of the cable guide 1 and the other end portion of the cable 2 in such a manner that these other end portions are directed toward the first support member 20 along the sliding direction Q. In this condition, when the slide door SD is opened, the second support member 30 is moved rearward to pass by the first support member 20. Therefore, in the fully open condition of the slide door SD, the second support member 30 supports the other end portion of the cable guide 1 and the other end portion of the cable 2 in such a manner that these other end portions are directed away from the first support member 20 along the sliding direction Q.

Generally, when the slide door SD is fully opened, the slide door SD is shifted outwardly from the vehicle body because of the opening/closing structure of the slide door SD. Therefore, the distance between the first support member 20 and the second support member 30 in a direction perpendicular to the direction Q of sliding movement of the slide door SD is larger in the fully open condition than in the fully closed condition.

With respect to the basic construction of the link members 3 forming the cable guide 1, as shown in FIGS. 5 to 8, the link member 3 includes a body portion 11, a pair of projections 13 which are formed on one end portion of the body portion 11, and function respectively as rotation shafts, a pair of reception portions (receiving holes in this embodiment) 15 which are provided at the other end portion of the body portion 11, and are adapted to rotatably support the respective projections 13 of the mating link member 3 to be connected to this link member 3, a pair of first abutment portions 17 formed at the one end portion of the body portion 11, and a pair of second abutment portions 19 formed at the other end portion of the body portion 11. The link member 3 is made of a resin or the like.

The body portion 11 has a generally rectangular tubular shape, and has such an inner size as to pass the cable 2 therethrough. The projections 13 are formed on and project respectively from extension portions 11a extending respectively from opposed portions (upper and lower side wall portions in FIG. 5) at an open portion in the one end portion of the body portion 11. The reception portions 15 are provided respectively at extension portions 11b extending respectively from opposed portions (upper and lower side wall portions in FIG. 5) at an open portion in the other end portion of the body portion 11. The projections 13 and the reception portions 15 are formed such that an axis, interconnecting the two projections 13, is parallel to an axis interconnecting the two reception portions 15 (that is, these axes extend in the same direction)

Figure 8:
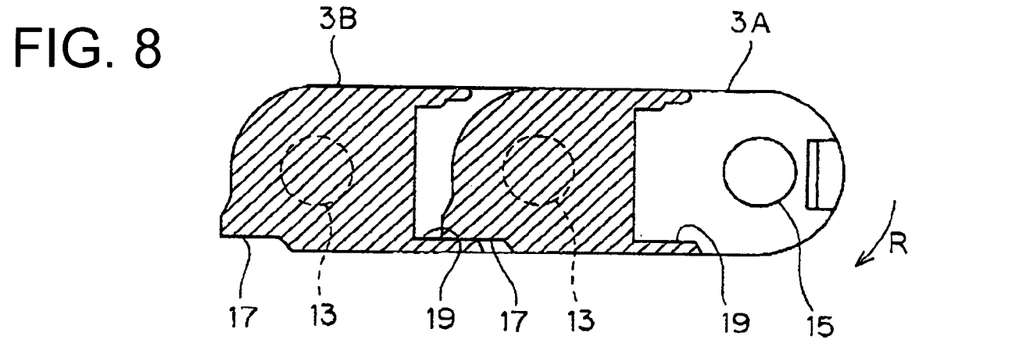
FIG. 8 is a cross-sectional view showing the link members so interconnected as to be bent in one direction.

The distance between the two extension portions 11b, each having the reception portion 15, is slightly larger than the distance between the two extension portions 11a each having the projection 13. Therefore, as shown in FIG. 8, at an interconnecting portion between the link members 3, the two link members 3A and 3B are interconnected in such a manner that the two projections 3 of one link member 3A (see FIG. 8) are fitted respectively into the reception portions 15 of the other link member 3B (see FIG. 8) from the inner side. In this interconnected condition, the projections 13 are rotatably held in the reception portions 15, respectively, and therefore the bending angle can be varied at the interconnecting portion between the two link members 3A and 3B.

The first and second abutment portions 17 and 19 serve as means for limiting a bending direction R (see FIG. 8) at the interconnecting portion between the link members 3, and are so arranged that when the two link members 3A and 3B are interconnected, the first abutment portions 17 abut against the second abutment portions 19, respectively, with the two interconnected link members 3A and 3B extending linearly. Because of the provision of the abutment portions 17 and 19, the bending direction R is so limited that at the interconnecting portion, one link member 3A is allowed to be bent relative to the other link member 3B only in one bending direction R from the linearly-extending condition.

Namely, when the link members 3, shown in FIGS. 5 to 8, are interconnected, these link members can be bent only in one direction from a linear condition.

Figure 9:
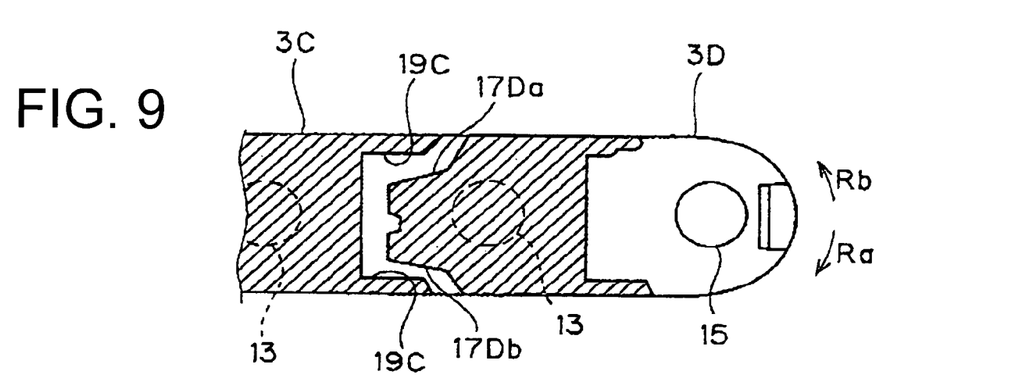
FIG. 9 is a cross-sectional view showing link members so interconnected as to be bent in both directions.

There may be provided a construction in which interconnected link members can be bent within a predetermined bending angle in both directions from a linear condition, and in this case, for example, when link members 3C and 3D are interconnected as shown in FIG. 9, abutment portions 17Da and 17Db are spaced a predetermined distance from abutment portions 19C, respectively, in a linear condition, and when the link member 3D is bent relative to the link member 3C in either bending direction Ra, Rb at the predetermined angle, the abutment portion 17Da, 17db is brought into abutting engagement with the corresponding abutment portion 19C.

The cable guide 1 includes a first section S1 disposed at the vehicle body B, and a second section S2 disposed at the slide door SD.

The first section S1 can be bent in both directions from the generally-linear condition, and the angle of bending of each interconnecting portion between the link members 3 of this first section S1 is so determined that the cable guide 1 will not interfere with any members provided at the vehicle body B.

In this embodiment, the first section S1 includes a section S1a having the plurality of link members 3 so interconnected as to be bent only in one direction from the linear condition, and a section S1b having the plurality of link members 3 so interconnected as to be bent in both directions from the linear condition. Namely, all of the interconnecting portions of the first section S1 are not bendable in both directions, but this first section S1 is bendable in both directions as a whole with respect to the longitudinal direction.

The section S1a which is bendable only in the one direction is that portion of the first section S1 disposed at the vehicle body B, and here the section, including one interconnecting portion between the link member 3 and the first support member 20 and two interconnecting portions each between the corresponding link members 3, is the section S1a bendable only in the one direction (see FIG. 4).

The section S1b which is bendable in both directions is that portion of the first section S1 disposed adjacent to the second section S2 (that is, disposed at the slide door SD), and here the section, including four interconnecting portions each between the corresponding link members 3, is the section S1b bendable in both directions (see FIG. 4).

When the other end portion of the cable guide 1 is pulled in a right-hand direction in FIGS. 3 and 4 (that is, the slide door SD is fully closed), the whole of the first section S1 is bent clockwise (in FIGS. 3 and 4). In this case, the angle of bending of each interconnecting portion between the link members 3 of the first section S1 is so determined that the cable guide 1 will not interfere with an outer body of the slide door SD, and also will not interfere with a rail RL for the slide door SD which is provided at the vehicle body B.

One the other hand, when the cable guide 1 is pulled in a left-hand direction in FIGS. 3 and 4 (that is, the slide door SD is fully opened), the section S1a of the first section S1 which is bendable only in the one direction is brought into a linear condition, while the section S1b which is bendable in both directions is bent counterclockwise (in FIGS. 3 and 4) In this case, the angle of bending of each interconnecting portion between the link members 3 at the first section S1 is so determined that the cable guide 1 will not interfere with a body portion Ba of the vehicle body B provided at the rear side of the slide door frame. More specifically, the angle of bending of the section S1a (which is bendable only in the one direction) of the first section S1 toward the rear side of the vehicle is 0 degree, while the section S1b (which is bendable in both directions) can be bent at an angle of 20 degrees toward the rear side of the vehicle at each of the four interconnecting portions each between the link members 3. And, the first support member 20 supports the one end portion of the cable guide 1 in such a manner that this one end portion is inclined toward the rear side of the vehicle at an angle of 10 degrees relative to a direction perpendicular to the sliding direction Q. Therefore, 20 (degrees)×4+10 (degrees)=90 (degrees) is obtained, and the second section S2 can extend rearwardly along the sliding direction Q.

Namely, the cable guide 1 extends away from the vehicle body B, and is bent at the first section S1 to extend toward the second support member 30.

Particularly in the fully open condition, the cable guide 1 extends away from the vehicle body B at the section S1a, and is bent toward the rear side of the vehicle body B at the section S1b.

The bending angle and bending direction of the interconnecting portions each between the link members 3 at the first section S1 are suitably changed, depending on the mounting positions, shapes, etc., of the various members (the body itself, the rail RL and so on) of the vehicle body B.

The second section S2 can be bent only in one direction from the generally linear condition.

When the other end portion of the cable guide 1 is pulled in the right-hand direction (in FIGS. 3 and 4) (that is, the slide door SD is fully closed), the second section S2 extends linearly toward the second support member 30. On the other hand, when the other end portion of the cable guide 1 is pulled in the left-hand direction (in FIGS. 3 and 4) (that is, the slide door SD is fully opened), the second section S2 is bent clockwise (in FIGS. 3 and 4), and is inverted into a generally recumbent J-shape to extend toward the second support member 30.

Figure 10:
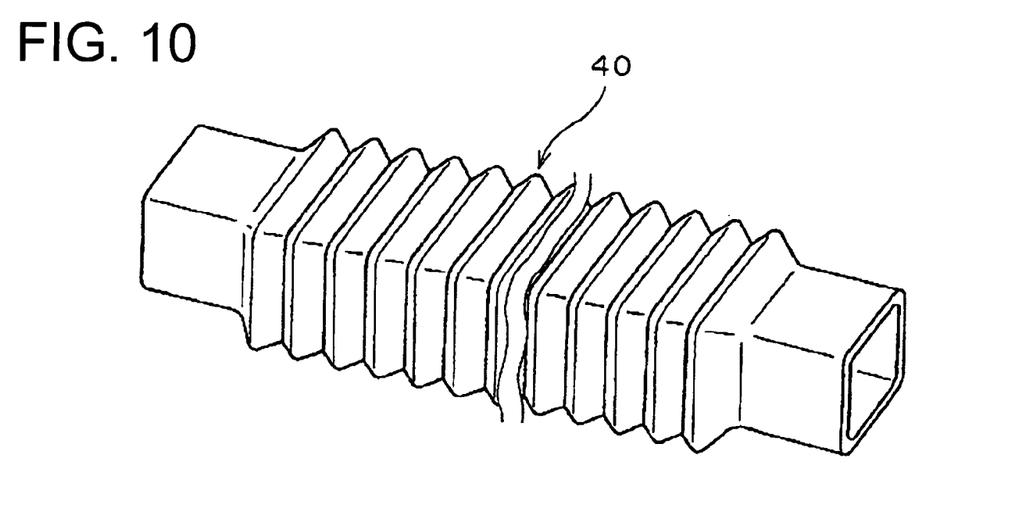
FIG. 10 is a perspective view of a tube member for covering the cable guide.

The cable guide 1 is covered with a tube member 40 shown in FIG. 10.

The tube member 40 is made of an elastic material such as rubber and an elastic plastics material, and is formed into a tubular shape, and can be flexed. In this embodiment, although this tube member is in the form of a bellows so that it can be easily flexed, it does not always need to be formed into a bellows.

In the cable-installing and supporting portion structure of the slide door SD having this construction, when the slide door SD is in the fully closed condition, the cable guide is in a condition (first bending condition) in which the whole of the first section S1 is bent clockwise while the second section S2 extends in the generally linear condition.

In this condition, when the slide door SD is opened, the section S1a (bendable only in the one direction) of the first section S1 extends linearly, while the section S1b, bendable in both directions, is bent in the opposite direction. Subsequently, the second section S2 which can be bent only in the one direction is gradually bent in such a manner that this bending proceeds from the link member 3, disposed adjacent to the first section S1, toward the link members 3 disposed at the slide door SD. Therefore, when opening the slide door SD, the bending mode of the cable guide 1 is limited to the predetermined mode.

In the fully open condition of the slide door SD, the second section S2 is inverted into a generally J-shape, and extends toward the second support member 30 (second bending condition).

When closing the slide door SD, the cable guide is bent and deformed in a manner reverse to the above-mentioned manner.

In the cable-installing and supporting portion structure of the above construction, the cable guide 1 extends away from the vehicle body B, and further extends toward the second support member 30. Therefore, the cable guide can be prevented from interference with other members of the vehicle body B (that is, the body portion Ba of the vehicle body B provided at the rear side of the slide door frame, and the rail RL for the slide door SD in this embodiment).

Particularly, the first section S1 includes the section S1a having the plurality of link members 3 so interconnected as to be bent only in the one direction from the linear condition, and the section S1b having the plurality of link members 3 so interconnected as to be bent in both directions from the linear condition. Therefore, the manner of extending of the cable guide 1 away from the vehicle body B can be easily changed between the first bending condition and the second bending condition.

And besides, the second section S2 of the cable guide 1 can be bent only in the one direction, and therefore this second section S2 can also be prevented from interference with the other members.

Furthermore, the one end portion of the cable guide 1 is supported by the first support member 20 in such a manner that this one end portion is inclined toward the rear side of the vehicle, and therefore when opening the slide door SD, a force, acting on the second section S2 of the cable guide 1 in the direction of the length thereof, can be easily converted into a force to smoothly bend the first section S1 and so on in the opposite direction. This prevents the buckling, etc., of the second section S2, so that the cable guide 1 can be easily smoothly bent and deformed from the first bending condition into the second bending condition.

Furthermore, the cable guide 1 is covered with the flexible tube member 40 of a tubular shape, and therefore waterproof, dust-proof measures and so on for the cable 2 can be provided. And besides, the production of a sound, resulting from a relative movement between the adjacent link members, can be prevented.

As described above, according to the invention, the cable guide extends away from the vehicle body, and further extends toward the second support member, and therefore the cable guide can be prevented from interference with the other members of the vehicle body.

According to the invention, the direction of bending of the second section of the cable guide is limited to the predetermined direction, and therefore the second section can be prevented from interference with other members.

According to the invention, when sliding the slide door, the cable guide is smoothly bent and deformed from the first bending condition into the second bending condition.

According to the invention, the angle of bending of the first section of the cable guide is so determined that the cable guide will not interfere with any member of the vehicle body, and therefore the interference with the vehicle body can be more positively prevented.

According to the invention, the first section of the cable guide includes the section which can be bent only in the one direction from the generally linear condition, and therefore the manner of extending of the cable guide away from the vehicle body can be easily changed between the first bending condition and the second bending condition.

According to the invention, waterproof and dust-proof measures and so on for the cable can be provided.

The Second Preferred Embodiment

Figure 11:
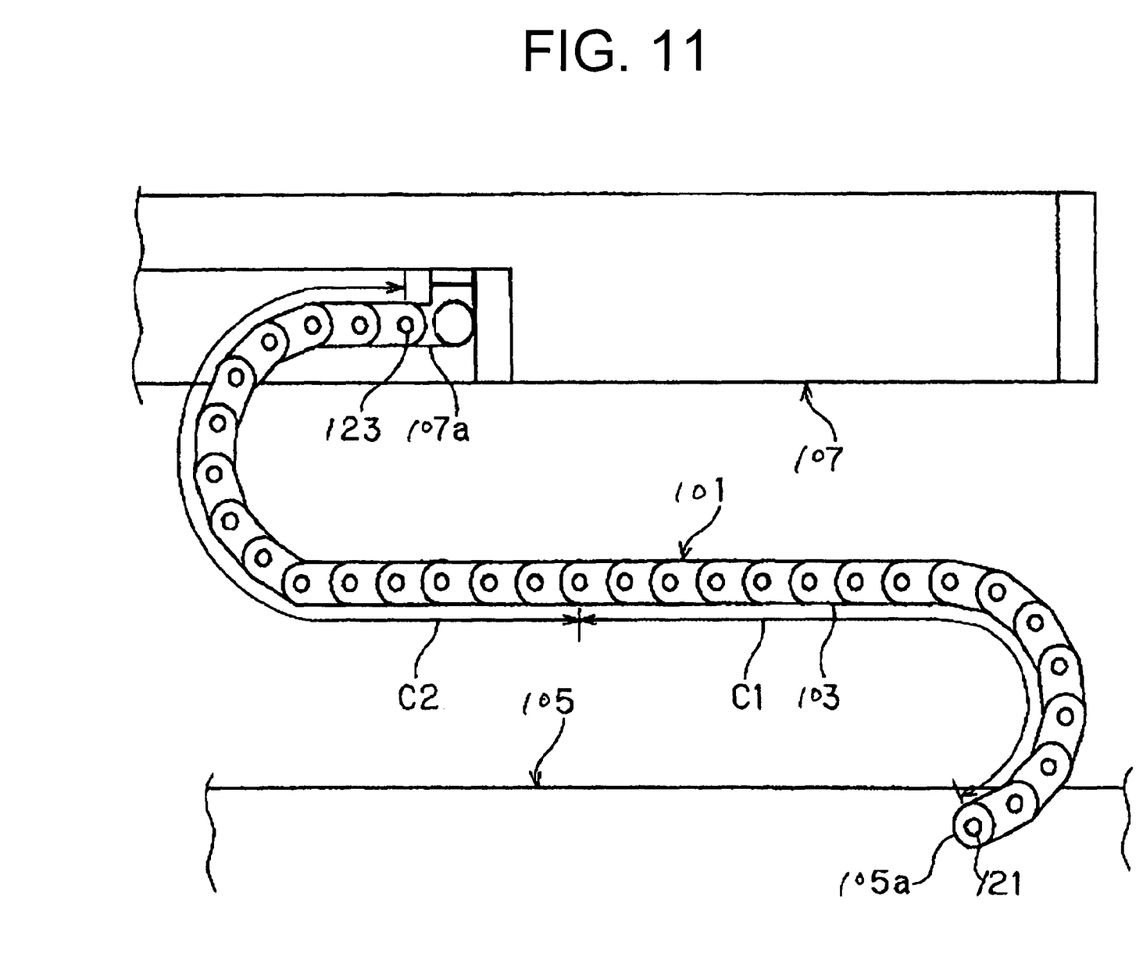
FIG. 11 is a plan view of a power supply apparatus for a vehicle slide door employing a second preferred embodiment of the present invention.
Figure 12:
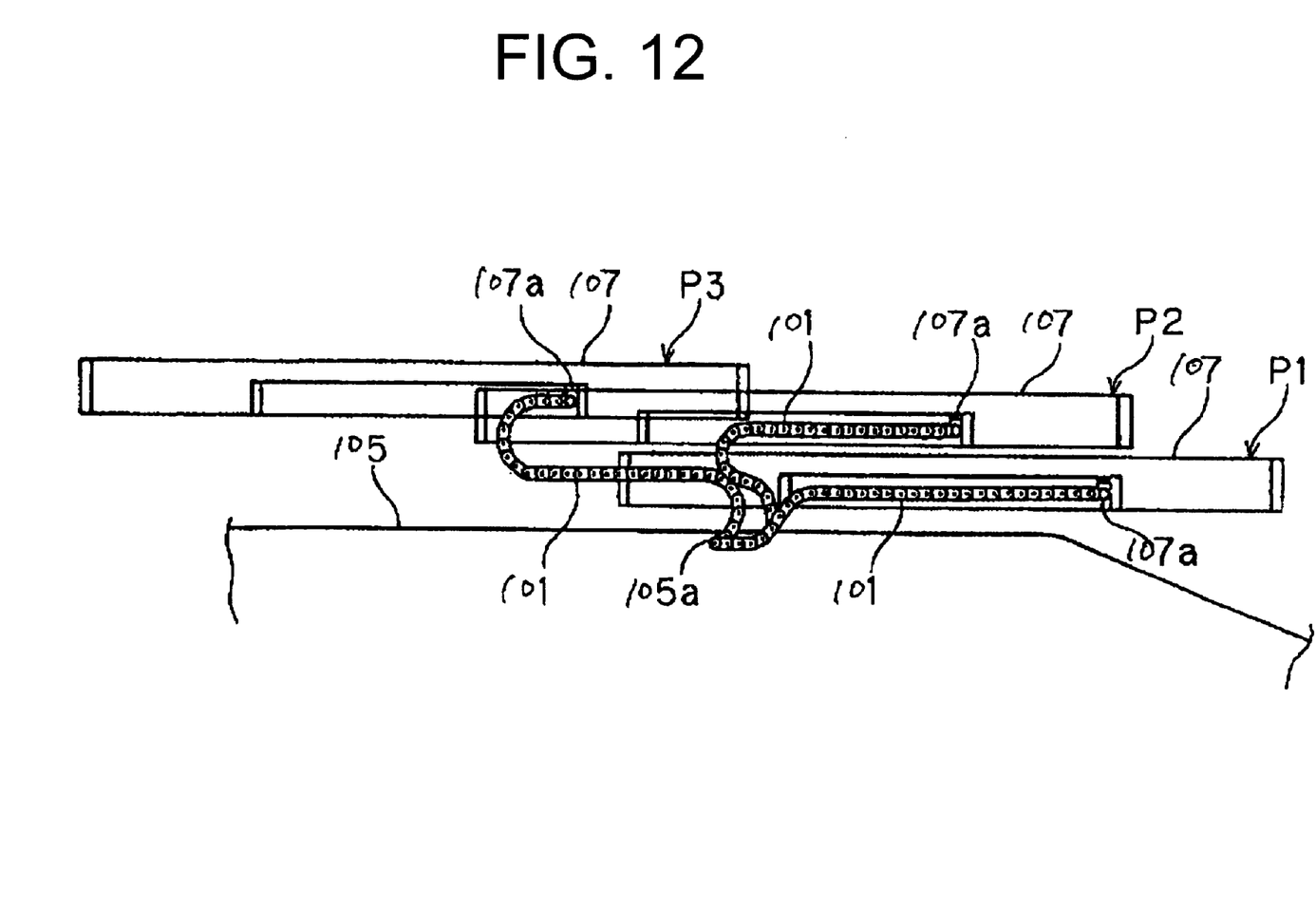
FIG. 12 is a view showing the manner of opening and closing the slide door in the power supply apparatus of FIG. 1.

FIG. 11 is a plan view of a power supply apparatus for a vehicle slide door in a vehicle (automobile) V, employing a second preferred embodiment of the present invention. FIG. 12 is a view showing the manner of opening and closing the slide door in the power supply apparatus of FIG. 11.

Figure 14:
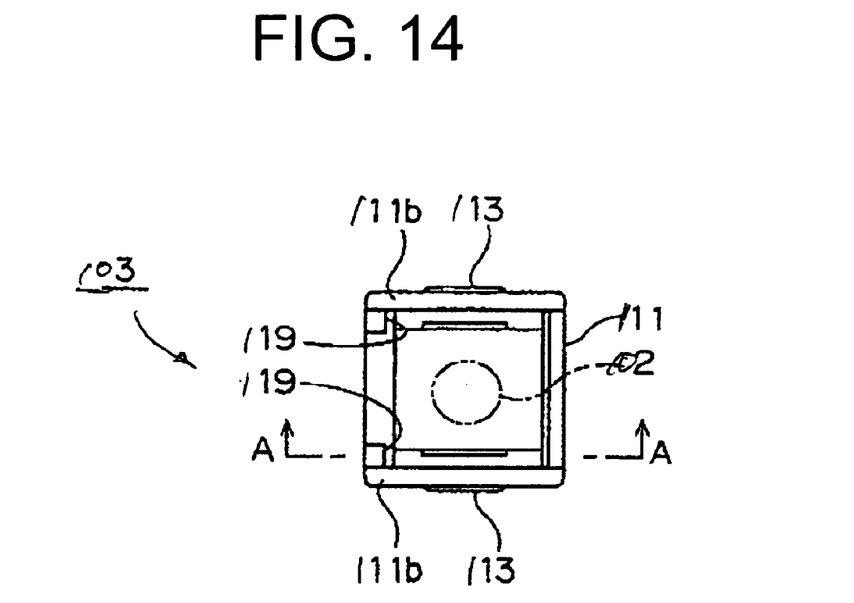
FIG. 14 is a front-elevational view of the link member.

This power supply apparatus comprises the cable guide 101 shown in FIGS. 11 and 12, and a power supply cable 102 (see FIG. 14). The cable guide 1 comprises a plurality of link members 103 interconnected into a linear configuration, and one end portion of this cable guide 1 is connected to a vehicle body-side mounting portion (fixing-side mounting portion) 105a of a vehicle body (fixing structure) 105, while the other end portion thereof is connected to a door-side mounting portion (moving-side mounting portion) 107a of the slide door (moving structure) 107. The power supply cable 102 is guided by the cable guide 101, and is installed between the vehicle body 105 and the slide door 107. In FIG. 12, when the slide door 107 is located in a position P1, the slide door 107 is in a completely closed condition (a fully closed condition), and when the slide door 107 is located in a position P2, the slide door 107 is in a partially open condition. (a half open condition), and when the slide door 107 is located in a position P3, the slide door 107 is in a completely open condition (a fully open condition).

Figure 13:
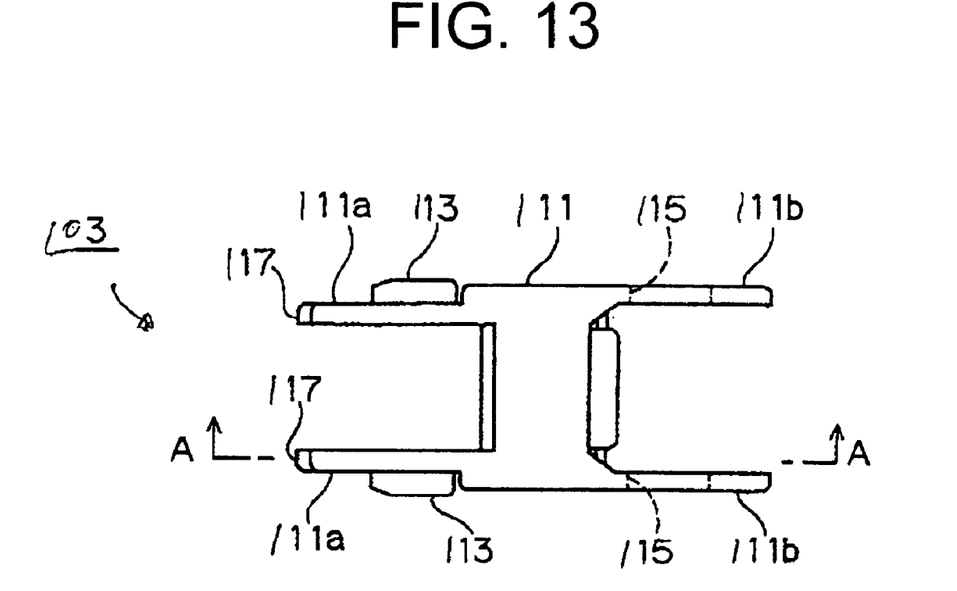
FIG. 13 is a side-elevational view of a link member of the cable guide.
Figure 15:
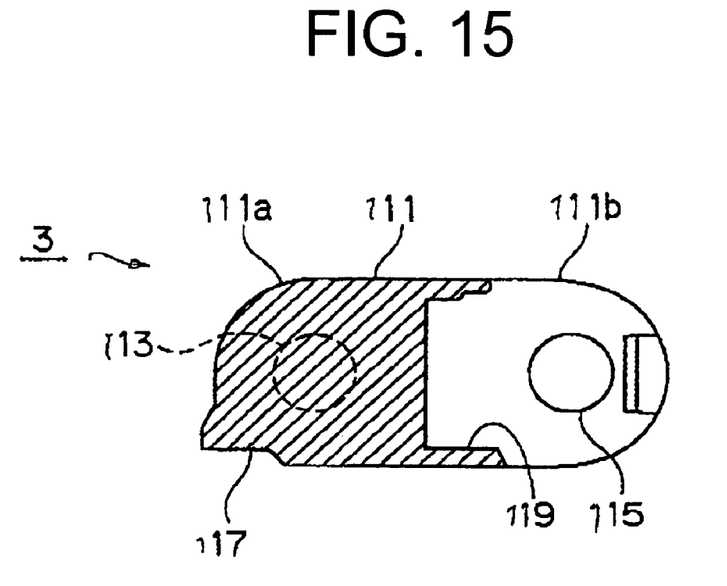
FIG. 15 is a cross-sectional view taken along the line A—A of FIGS. 13 and 14.

As shown in FIGS. 13 to 15, each of the link member 103, forming the cable guide 101, includes a body portion 111, a pair of projections 113 which are formed on one end portion of the body portion 111, and which function respectively as rotation shafts, a pair of reception portions (receiving holes in this embodiment) 115 which are provided at the other end portion of the body portion 111, and are adapted to rotatably support the respective projections 113 of the mating link member 103 to be connected to this link member 103, a pair of first abutment portions 117 formed at the one end portion of the body portion 111, and a pair of second abutment portions 119 formed at the other end portion of the body portion 111. The link member 103 is made of a resin.

The body portion 111 has a generally rectangular tubular shape, and has such an inner size as to pass the power supply cable 102 therethrough. The projections 113 are formed on and project respectively from extension portions 111a extending respectively from opposed portions (upper and lower side wall portions in FIG. 13) at an open portion in the one end portion of the body portion 111. The reception portions 115 are provided respectively at extension portions 11b extending respectively from opposed portions (upper and lower side wall portions in FIG. 13) at an open portion in the other end portion of the body portion 111. The projections 113 and the reception portions 115 are formed such that an axis, interconnecting the two projections 113, is parallel to an axis interconnecting the two reception portions 115 (that is, these axes extend in the same direction).

Figure 16:
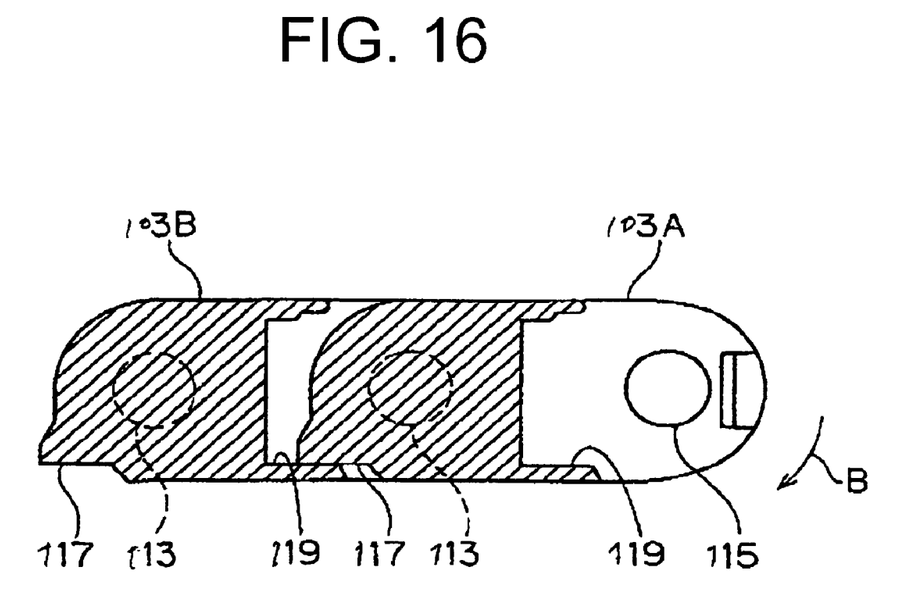
FIG. 16 is a cross-sectional view showing the interconnected link members.

The distance between the two extension portions 111b, each having the reception portion 115, is slightly larger than the distance between the two extension portions 111a each having the projection 113. Therefore, as shown in FIG. 16, at an interconnecting portion between the link members 103, the two link members 103A and 103B are interconnected in such a manner that the two projections 103 of one link member 103A (see FIG. 6) are fitted respectively into the reception portions 115 of the other link member 103B (see FIG. 16) from the inner side. In this interconnected condition, the projections 13 are rotatably held in the reception portions 115, respectively, and therefore the bending angle can be varied at the interconnecting portion between the two link members 103A and 103B.

The first and second abutment portions 117 and 119 serve as means for limiting a bending direction B (see FIG. 16) at the interconnecting portion between the link members 103, and are so arranged that when the two link members 103A and 103B are interconnected, the first abutment portions 117 abut against the second abutment portions 119, respectively, with the two interconnected link members 103A and 103B extending linearly. Because of the provision of the abutment portions 117 and 119, the bending direction B is so limited that at the interconnecting portion, one link member 103A is allowed to be bent relative to the other link member 103B only in one bending direction B from the linearly-extending condition.

The cable guide 101 includes a first section C1 and a second section C2 which extend in a longitudinal direction. The link members 103 are interconnected such that the bending directions B of the interconnecting portions in the same section C1, C2 are set to the same direction and that the bending direction of each interconnecting portion in the section C1 is opposite to the bending direction of each interconnecting portion in the section C2. Although the lengths of the sections C1 and C2 are not particularly specified, the length of the section C1 is smaller than the length of the section C2 in FIG. 2. Namely, when viewed from the vehicle body-side mounting portion (5a) side, the bending direction B of each interconnecting portion in the first section C1 is a counterclockwise direction (in FIG. 11), while the bending direction of each interconnecting portion in the second section C2 is a clockwise direction (in FIG. 11).

For obtaining this construction, there are prepared two chain members of predetermined lengths each having link members 103 which are interconnected in such a manner that the first abutment portions 117 of each link member can abut respectively against the second abutment portions 119 of the mating link member. The two chain members are interconnected in an interconnecting manner reverse to the interconnecting manner shown in FIG. 16 (that is, in such an interconnecting manner that the first abutment portions 117 of the link member 103A in FIG. 16 are disposed at the upper side), thereby obtaining the above construction.

The cable guide 101 of this construction is installed between the vehicle body-side mounting portion 105a and the door-side mounting portion 107a so that during the movement of the slide door 107, this cable guide 101 can be bent into a generally S-shape (when viewed from the top) in such a manner that the distance between the vehicle body-side mounting portion 105a and the door-side mounting portion 107a becomes a minimum. The link members 103, disposed respectively at the opposite ends of the cable guide 101, are rotatably connected at interconnecting portions 121 and 123 to the vehicle body-side mounting portion 105a and the door-side mounting portion 107a, respectively.

More specifically, in this embodiment, in accordance with the movement of the slide door 107, the door-side mounting portion 107a moves in a sliding direction, spaced a predetermined distance from the vehicle body-side mounting portion 105a, between two positions disposed respectively on opposite sides of the vehicle body-side mounting portion 105a serving as an intermediate position.

When the slide door 107 is located in the fully closed position P1 (fully closed condition), the distance between the vehicle body-side mounting portion 105a and the door-side mounting portion 107a is the largest, and also the cable guide 101 extends generally linearly in the direction of sliding of the slide door 107. More specifically, the section C2 is disposed in a generally linear condition, and the section C1 is bent in a stepped manner to absorb the distance between the vehicle body-side mounting portion 105a and the door-side mounting portion 107a. In this condition, the door-side mounting portion 107a and the vehicle body-side mounting portion 105a support the opposite end portions of the cable guide 101, respectively, in such a manner that these opposite end portions are generally opposed to each other along the sliding direction.

When the slide door 107 is located in the position P2 (half open condition) during the movement of this slide door 107, the vehicle body-side mounting portion 105a and the door-side mounting portion 107a approach each other, and the distance between the two is smaller in this condition than in the fully closed condition, so that a slack portion develops in the cable guide 101. Particularly in the half open condition, when the vehicle body-side mounting portion 105a and the door-side mounting portion 107a are disposed at the same position in the sliding direction (in the forward-rearward direction of the vehicle), the distance between the vehicle body-side mounting portion 105a and the door-side mounting portion 107a is the smallest, and the amount of slackening of the cable guide 101 is the largest.

In this condition, that portion of the section C2, disposed close to the section C1, is bent into a generally U-shape, while that portion of the section C2, disposed close to the fixed end thereof, is disposed in a linear condition, and also the section C1 is bent into a generally arcuate shape in the opposite direction. The generally arcuately-bent portion of the section C1 and the generally U-shaped bent portion of the section C2 jointly form a generally S-shaped bent portion when viewed from the top.

When the slide door 107 is located in the fully open position P3 (fully open-condition), the door-side mounting portion 107a, which has passed by the vehicle body-side mounting portion 105a, is disposed at a rear portion of the vehicle. In this condition, the distance between the vehicle body-side mounting portion 105a and the door-side mounting portion 107a is smaller than in the fully-closed condition, so that a slack portion develops in the cable guide 101.

In this condition, that portion of the section C2, disposed close to the fixed end thereof, is bent into a generally U-shape, while that portion of the section C2, disposed close to the section C1, is disposed in a linear condition, and also the section C1 is bent into a generally arcuate shape. The generally arcuately-bent portion of the section C1 and the generally U-shaped bent portion of the second C2 jointly for a generally S-shaped bent portion when viewed from the top.

Namely, when the slide door 107 is located in the half open position P2 or in the fully closed position P3, the cable guide 101 is forcibly bent into the generally S-shape when viewed from the top, thereby absorbing the slack of the cable guide 101.

The cable guide 101 is formed by interconnecting the link members 103 of a generally tubular shape, and therefore has a hollow shape. The power supply cable 102 is passed through the cable guide 101, and is installed to extend from the vehicle body to the slide door.

As described above, in this embodiment, regardless of whether the slide door 107 is open or closed, electric power can always be supplied to the slide door 107 by the power supply cable 2 which is guided by the cable guide 101, and is installed between the vehicle body 105 and the slide door 107.

During the sliding movement of the slide door 107 (particularly in the condition in which the distance between the vehicle body-side mounting portion 105*a* and the door-side mounting portion 107*a* is the smallest), that is, when the cable guide 101 is slackened, the cable guide 101 can be bent into the generally S-shape when viewed from the top. Therefore, when the cable guide is slackened during the opening and closing operations of the slide door 107 (in the half open condition or the fully open condition of the slide door 107 in this embodiment), the slackened shape of the cable guide 101 is forcibly formed into the generally S-shape when viewed from the top, thereby absorbing the slack of the cable guide 1 while stabilizing the slackened shape thereof. Therefore, it is not necessary to provide any means for receiving the cable guide 101 and the cable 102, installed by this cable guide 101, when the cable guide 101 is slackened, and also to provided any means for limiting the movement of the cable guide. Therefore, the construction can be simplified.

And besides, the length of the cable guide 101, as well as the length of the power supply cable 102, can be properly determined in accordance with the amount of movement of the slide door 107 and so on, and therefore the power supply cable 102 can be shortened, and as a result an electrical transmission loss and the cost of the wire can be reduced.

In addition, this construction can easily meet a size change of the power supply cable 102.

The power supply cable 102 is prevented from being twisted in accordance with the movement of the slide door 107.

Furthermore, the power supply cable 102 is passed through the cable guide 101, and is installed, and therefore the cable 102 can be positively and easily installed along the cable guide 101, and besides the cable 102 can be protected by the cable guide 1.

The cable guide 101 can be formed, using the link members 103 of the simple structure.

Although the cable guide of this embodiment is applied to the apparatus for supplying electric power to the slide door, the cable guide of this embodiment can be used for installing a cable which need to be installed between an arbitrary fixing structural member and an arbitrary moving structural member. For example, the cable guide can be used for installing a cable between a seat, slidably mounted on the vehicle body, and the vehicle body, and for installing a cable between the vehicle body and a sun roof-opening/closing member.

According to the invention, the power supply cable is guided by the cable guide, and is installed between the vehicle body and the slide door, and therefore electric power can always be supplied to the slide door regardless of whether the slide door is open or closed.

During the sliding movement of the moving structural member, that is, when the cable guide is slackened, the intermediate portion of the cable guide 1 in the longitudinal direction can be bent into the generally S-shape when viewed from the top. Therefore, when the cable guide is slackened during the opening and closing operations of the slide door, the slackened shape of the cable guide is forcibly formed into the generally S-shape when viewed from the top, thereby absorbing the slack of the cable guide while stabilizing the slackened shape thereof. Therefore, it is not necessary to provide any means for receiving the cable guide and the cable, installed by this cable guide, when the cable guide is slackened, and also to provided any means for limiting the movement of the cable guide Therefore, the construction can be simplified.

And besides, the length of the cable guide, as well as the length of the power supply cable, can be properly determined in accordance with the amount of movement of the slide door and so on, and therefore the power supply cable can be shortened, and as a result an electrical transmission loss and the cost of the wire can be reduced.

In addition, this construction can easily meet a size change of the power supply cable.

The power supply cable is prevented from being twisted in accordance with the movement of the slide door.

According to the invention, the power supply cable is passed through the cable guide, and is installed, and therefore the cable can be positively and easily installed along the cable guide, and besides the cable can be protected by the cable guide.

According to the invention, the cable guide can be formed, using the link members of the simple structure.

What is claimed is:

1. A power supply apparatus comprising:
    a cable;
    a cable guide for guiding the cable, the cable guide comprising a plurality of link members interconnected so that each link member can pivot relative to at least one adjacent link member;
    a first support member supporting a first end portion of the cable guide in such a manner that the first end portion is directed in non-parallel relation to a generally linear condition; and
    a second support member configured for supporting a second end portion of the cable guide, the second support member being capable of moving to pass by the first support member;
    wherein the cable guide includes a first section and a second section, the first section includes the first end portion, and the second section includes the second end portion;
    the link members of the first section being configured so that the first section can be bent in both of a predetermined direction and an opposite direction from said predetermined direction from said generally linear condition; and
    the link members in the second section being configured so that the second section is capable of being bent only in the opposite direction to the predetermined direction from the generally linear condition.

2. The power supply apparatus according to claim 1, wherein the cable guide can be bent and deformed between a first bending condition and a second bending condition;

in the first bending condition, the cable guide extends away from the first support member and further extends generally linearly toward the second support member; and, in the second bending condition, the cable guide extends away from the first support member, and further is inverted into a generally J-shape to extend toward the second support member.

3. The power supply apparatus according to claim 2, wherein, in the first bending condition, the first support member supports the one end portion of the cable guide in such a manner that the one end portion is inclined away from the second support member relative to a direction perpendicular to the generally linear condition.

4. The power supply apparatus according to claim 1, wherein the first section includes a section having the plurality of link members so interconnected as to be bent only in one direction from the linear condition, and a section having the plurality of link members so interconnected as to be bent in both directions from the linear condition.

5. The power supply apparatus according to claim 1, wherein the cable guide is covered with a flexible tube member of a tubular shape.

6. A power supply apparatus for a vehicle slide door, comprising:

a cable;

a cable guide comprising a plurality of link members interconnected so that each link member can pivot relative to at least one adjacent link member, the cable guide including a first section and a second section, interconnecting portions of the link members in the first section being configured so that the first section is capable of being bent in a predetermined direction from a generally linear condition, interconnection portions of the link members in the second section being configured so that the second section is capable of being bent only in an opposite direction opposite to the predetermined direction from the generally linear condition, so that intermediate portion of the cable guide can be bent into a generally S-shape;

wherein each of the link members includes:

a body portion of a generally tubular shape for accommodating the cable;

projections which are formed respectively on opposed side walls of one end portion of the body portion and which function respectively as rotation shafts;

reception portions provided respectively at opposed side walls of the other end portion of the body portion such that axes of the reception portions are parallel to axes of the projections of the mating link member to be connected to the link member, the projections being fitted into the reception portions to be rotatably supported;

a first abutment portion formed at the one end portion of said body portion; and a second abutment portion formed at the other end portion of the body portion to abut against the first abutment portion of the mating link member thereby limiting the rotation range of the mating link member.

7. A cable guide for guiding a cable between a fixing structure and a moving structure, comprising:

a plurality of link members interconnected so that each link member can pivot relative to at least one adjacent link member, the plurality of link members being mutual connected by interconnecting portions, a bending direction of the interconnecting portions being limited so that one of any two adjacent interconnected link members is allowed to be bent relative to the other link member only in one direction from a linearly extended condition;

the cable guide including a first section and a second section, the bending direction of the interconnecting portions in each of the first and second sections are set to the same direction and the bending direction of each interconnecting portion in the first section is opposite to the bending direction of each interconnecting portion in the second section so that the cable guide can be bent into a generally S-shape;

wherein each of the plurality of linear members includes:

a body portion of a generally tubular shape;

projections which are formed respectively on opposed side walls of one end portion of the body portion and which function respectively as rotation shafts;

reception portions provided respectively at opposed side walls of the other end portion of the body portion such that axes of the reception portions are parallel to axes of the projections of the mating link member to be connected to the link member, the projections being fitted into the reception portions to be rotatably supported;

a first abutment portion formed at the one end portion of said body portion; and a second abutment portion formed at the other end portion of the body portion to abut against the first abutment portion of the mating ink member thereby limiting the rotation range of the mating link member.

8. An automobile comprising:

a vehicle body;

a moving structure slidably mounted on the vehicle body;

a cable installed between the vehicle body and the moving structure; and a cable guide for guiding the cable;

wherein the cable guide includes a plurality of link members interconnected into a linear configuration so that each link member can pivot relative to at least one adjacent link member and the cable guide includes a first section and a second section, the link members in the first section being configured so that the first section is capable of being bent in a predetermined direction from a generally linear condition, the link members in the second section being configured so that the second section is capable of being bent only in an opposite direction opposite to the predetermined direction from the generally linear condition.

9. The automobile according to claim 8, wherein the moving structure is a slide door of the vehicle.

* * * * *